United States Patent
Bürkle et al.

(10) Patent No.: US 7,029,263 B2
(45) Date of Patent: Apr. 18, 2006

(54) INJECTION MOLDING DEVICE WITH INTERMEDIATE STORAGE SPACE

(75) Inventors: Erwin Bürkle, Benediktbeuern (DE); Hans Wobbe, Herrsching (DE); Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 108 days.

(21) Appl. No.: 10/413,461

(22) Filed: Apr. 14, 2003

(65) Prior Publication Data
US 2003/0219507 A1 Nov. 27, 2003

(30) Foreign Application Priority Data
Apr. 16, 2002 (DE) ................. 102 16 754

(51) Int. Cl.
*B29C 45/02* (2006.01)
(52) U.S. Cl. ............. 425/208; 425/557; 425/559
(58) Field of Classification Search ............ 425/382.4, 425/204, 205, 208, 209, 557, 559; 366/89, 366/323
See application file for complete search history.

(56) References Cited

U.S. PATENT DOCUMENTS

| | | | |
|---|---|---|---|
| 3,020,591 A | 2/1962 | Breher et al. | |
| 3,245,115 A | 4/1966 | Ecklund | |
| 4,423,960 A * | 1/1984 | Anders | 366/89 |
| 4,557,683 A | 12/1985 | Meeker et al. | |
| 4,708,623 A * | 11/1987 | Aoki et al. | 425/202 |
| 5,000,900 A | 3/1991 | Baumgartner | |
| 5,110,279 A | 5/1992 | Amemiya et al. | |
| 5,380,186 A | 1/1995 | Hettinga et al. | |
| 5,403,178 A | 4/1995 | Steger | |
| 5,499,870 A * | 3/1996 | Rockstedt | 425/204 |
| 5,804,230 A | 9/1998 | Hasegawa et al. | |
| 6,109,910 A | 8/2000 | Sekido | |
| 6,790,023 B1 * | 9/2004 | Collins et al. | 425/204 |
| 2002/0136084 A1 * | 9/2002 | Derezinski | 366/89 |

FOREIGN PATENT DOCUMENTS

| | | |
|---|---|---|
| FR | 1438470 | 5/1966 |
| WO | WO 86/06321 | 11/1986 |
| WO | WO 0178964 | 10/2001 |
| WO | WO 0202293 | 1/2002 |

* cited by examiner

*Primary Examiner*—Tim Heitbrink
(74) *Attorney, Agent, or Firm*—Henry M. Feiereisen

(57) ABSTRACT

An injection molding device includes a continuously operating extruder and a discontinuously operating injection unit receiving plastic material from the extruder. The extruder has an extruder barrel which includes a plasticizing zone and a discharge zone, whereby the discharge zone is configured to provide an intermediate storage space and has a cross sectional area which is greater than a cross sectional area of the plasticizing zone. In this way, the discharge zone provides a buffer volume which is filled during the injection process and then emptied again.

10 Claims, 2 Drawing Sheets

INJECTION MOLDING DEVICE WITH INTERMEDIATE STORAGE SPACE

CROSS-REFERENCES TO RELATED APPLICATIONS

This application claims the priority of German Patent Application, Ser. No. 102 16 754.0-16, filed Apr. 16, 2002, pursuant to 35 U.S.C. 119(a)–(d), the disclosure of which is incorporated herein by reference.

BACKGROUND OF THE INVENTION

The present invention relates, in general, to an injection molding device for processing plastic material.

An injection molding device of a type involved here is disclosed in German Pat. No. DE-PS 1 142 229 and includes a plasticizing unit having a continuously operating extruder and an injection unit having a discontinuously operating piston and cylinder arrangement. As no plastic material can be supplied during injection process by the injection unit, a pressurized storage space is placed between the extruder and the injection unit for accumulating the plasticized plastic material that continuously builds up.

FIG. 1 shows an injection molding device of this conventional type with an injection unit, which has an injection cylinder 65 and an injection piston 60 reciprocating in the injection cylinder 65. The interior of the injection cylinder 65 is connected via channels 90 and a check valve 35 with a buffer reservoir, generally designated by reference numeral 25. The buffer reservoir 25 includes a tubular barrel 30 and a screw 70, which is rotatably received in the barrel 30 and movable along the axis of the barrel 30. At its end distal to the injection unit, the barrel 30 of the buffer reservoir is in communication with a cylindrical chamber 20 under pressure. A channel 10 connects the interior of the barrel 30 with a continuously operating extruder (not shown).

In operation, plasticized plastic material is fed via the channel 10 into the screw flight of the screw 70. As the screw 70 rotates, plastic material is advanced in the direction of the check valve 35 and flows via the channels 90 into the interior of the injection cylinder 65 while the piston 60 is displaced. During the injection process, the piston 60 is operated to inject plastic material via an injection head 50 into a molding tool (not shown), which is attached to a platen 80. The check valve 35 prohibits hereby a passage of plastic material from the screw 70 into the channels 90. As the screw 70 continues to rotate, a buffer 40 is formed ahead of the check valve 35 and forces the screw 70 to move in the direction of the biased cylindrical chamber 20.

As soon as the injection process is over, the check valve 35 opens and the biased cylindrical chamber 20 moves the screw 70 in the direction of the check valve 35 so that the injection cylinder 65 can be charged again.

This prior art suffer shortcomings because even though the extruder operates continuously, irregularities are encountered during the transport of plastic material so that sensitive plastic materials may be damaged.

German Pat. No. DE-PS 1 142 229 also refers to the option to use a continuously operating extruder for alternating supply of plastic material to two injection units. When reversing a valve, which is positioned between the extruder and both injection units, momentary pressure surges may be encountered that also adversely affect the plastic material.

German Pat. No. 197 15 229 discloses a method and apparatus for linking a continuous plasticizing operation with a cyclical, discontinuous melt discharge, by using an interposed buffer reservoir for receiving and storing continuously plasticized and conveyed plastic material.

It would be desirable and advantageous to provide an improved injection molding device, which obviates prior art shortcomings and which is constructed to substantially eliminate the occurrence of pressure surges and inhomogeneities in the plastic material

SUMMARY OF THE INVENTION

According to one aspect of the present invention, an injection molding device includes a continuously operating extruder having an extruder barrel which includes a plasticizing zone and a discharge zone, and a discontinuously operating injection unit receiving plastic material from the extruder, wherein the discharge zone of the extruder barrel is constructed to provide an intermediate storage space and has a cross sectional area which is greater than a cross sectional area of the plasticizing zone.

The present invention resolves prior art problems by configuring the discharge zone of the extruder as buffer zone. Hereby, the extruder barrel is expanded in cross section in the area of the discharge zone so as to provide a substantial free volume which is filled and emptied in a cycle with the injection process. Suitably, the free volume of the buffer zone controllable via a throttling or restrictive flow zone.

According to another feature of the present invention, the extruder may include at least one extruder screw received in the extruder barrel and having a first screw portion, which extends in the plasticizing zone, and a second screw portion, which extends in the intermediate storage space and has an outer cross section which is greater than an outer cross section of the first screw portion. Thus, the extruder screw is so configured as to have a screw portion in the buffer zone which conforms to the geometry of the expanded extruder barrel.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way.

Figure 2:
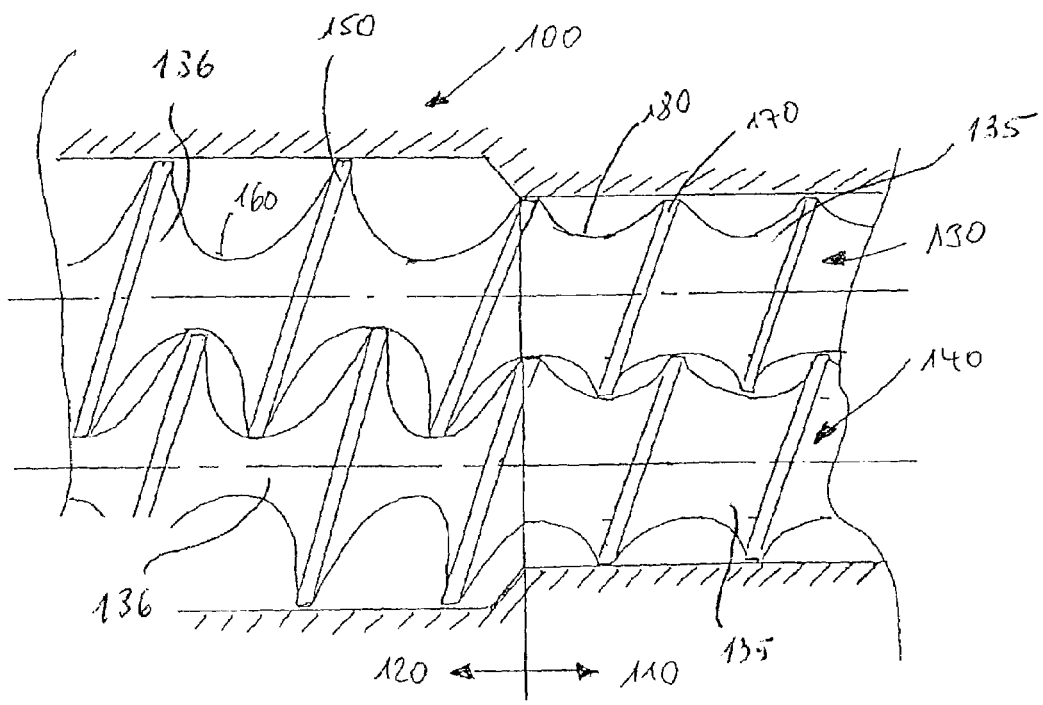
FIG. 2 is a cutaway side view of an extruder of an injection molding device in accordance with the present invention, depicting in detail the configuration of a buffer zone in a discharge zone of the extruder.

Turning now to FIG. 2, there is shown a cutaway side view of an extruder of an injection molding device in accordance with the present invention, depicting in detail the configuration of a buffer zone in a discharge zone of the extruder. The extruder includes an extruder barrel 100, which has a plasticizing zone 110 and a discharge zone 120, whereby the plasticizing zone 110 has a cross sectional area which is smaller than a cross sectional area of the discharge zone 120. The extruder involved here is of the twin-screw type, although it will be appreciated by persons skilled in the art that the principles described in the following description with respect to the twin-screw extruder are equally applicable to a single-screw extruder.

In the non-limiting example of FIG. 2, the extruder includes two screws, which are generally designated by reference numerals 130 and 140 and rotatably supported in the extruder barrel 100 in axis-parallel relationship. As shown in FIG. 2, each of the screws 130, 140 has a first screw portion 135, which extends in the plasticizing zone 110 and has a screw flight 170, and a second screw portion 136, which extends in the discharge zone 120 and has a screw flight 150, whereby the screw flights 150, 170 of one of the screws 130, 140 engages in recesses formed by the screw root of the other one of the screws 130, 140.

In the plasticizing zone 110, the extruder barrel 100 has a cross sectional area which is smaller than the cross sectional area in the discharge zone 120. Correspondingly, the screw portion 135 of each one of the screws 130, 140 has a screw channel 180 in the plasticizing zone 110 of a depth which is less than a screw channel 160 of the screw portion 136 in the discharge zone 112, while the screw flight 170 of the screw portion 135 in the plasticizing zone 110 has a height which is smaller than the screw flight 150 of the screw portion 136 in the discharge zone. In this way, the extruder is configured in the discharge zone 120 as a storage space to provide a buffer zone with a great free volume that can be charged and emptied in a cycle with the injection process. The buffer zone in the discharge zone 120 can hereby be controlled by a throttling or restrictive flow zone 55, i.e. by the diametrical relationship between the restriction 55 and the free diameter of the discharge zone 120.

Figure 1:
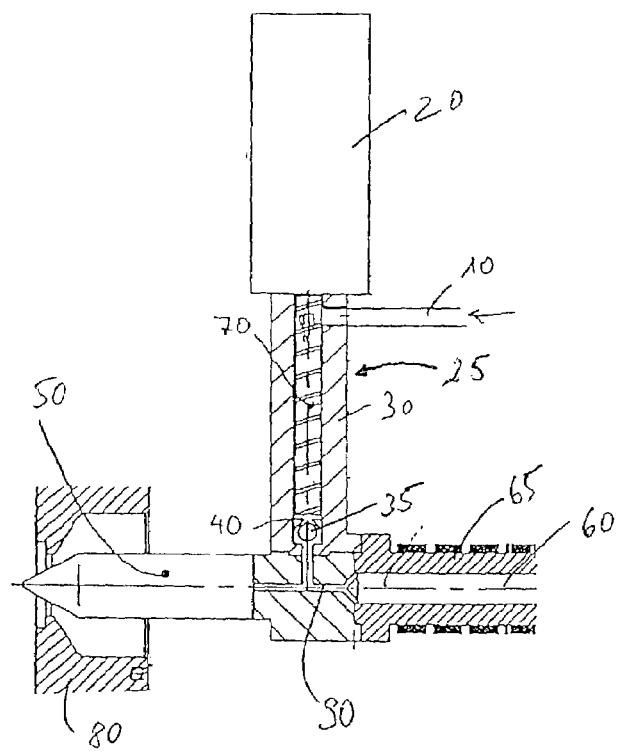
FIG. 1 is a schematic cross sectional view of a conventional injection molding device.
Figure 3:
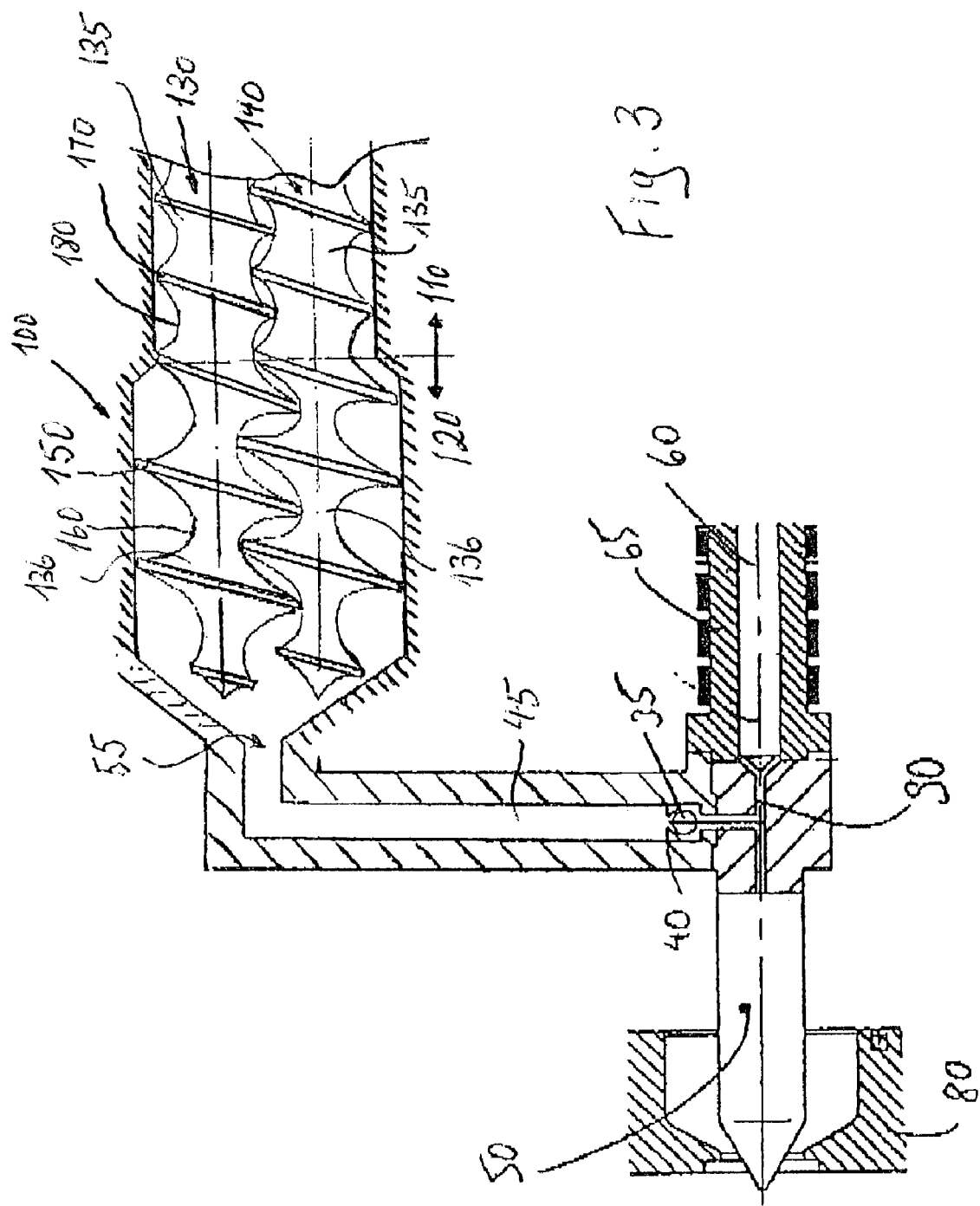
FIG. 3 is a schematic cross sectional view of an injection molding device according to the present invention and incorporating the extruder of FIG. 2.

Thus, as an injection of plastic material is carried out, plastic material continuously supplied by the extruder accumulates in the discharge zone 120 in the space between the threads of the screw flight 150 and is also mixed and advanced as the screws 130, 140 rotate. Thus, heat accumulation and inhomogeneities of the material are avoided. As shown in FIG. 3, the plasticized material is conveyed into a channel 45 to an injection unit of conventional type, such as the injection unit shown in FIG. 1, whereby parts corresponding with those in FIG. 1 are denoted in FIG. 3 by identical reference numerals and not explained again. Thus, the plasticized material is transported in the direction of check valve 35 and flows via channels 90 into the interior of the injection cylinder 65 while the piston 60 is displaced. During the injection process, the piston 60 is operated to inject plastic material via the injection head 50 into the adjacent molding tool. As soon as the injection process is over, check valve 35 opens and the injection cylinder 65 can be charged again.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An injection molding device, comprising:
a discontinuously operating injection unit; and
a continuously operating extruder having an extruder barrel which includes a plasticizing zone for plasticizing incoming plastic material and a discharge zone for discharging plasticized material into the injection unit, said extruder including an extruder screw which is received in the barrel and has a screw channel, wherein the screw channel of the extruder screw in the discharge zone has a channel depth which is greater than a channel depth in the plasticizing zone so as to provide an intermediate storage space which forms a buffer zone for plasticized material with a free volume that receives and empties in a cycle with an injection process.

2. The injection molding device of claim 1, wherein the extruder screw has a first screw portion, which extends in the plasticizing zone, and a second screw portion, which extends in the intermediate storage space and has an outer cross section which is greater than an outer cross section of the first screw portion.

3. The injection molding device of claim 2, and further comprising a restrictive flow zone at a forward end of the extruder screw to control a volume of the intermediate storage space.

4. The injection molding device of claim 1, wherein the screw channel in the discharge zone is constant.

5. The injection molding device of claim 1, wherein the screw channel in the plasticizing zone is constant.

6. The injection molding device of claim 1, wherein the discharge zone is disposed in immediate succession of the plasticizing zone.

7. The injection molding device of claim 1, wherein the discharge zone of the extruder barrel has a cross sectional area which is greater than a cross sectional area of the plasticizing zone.

8. The injection molding device of claim 1, wherein the extruder is a twin screw extruder and includes a second said extruder screw received in the barrel, whereby the extruder screws mesh with one another and are disposed in parallel relationship.

9. An injection molding device, comprising:
a discontinuously operating injection unit; and
a continuously operating extruder linked directly to the injection unit and having an extruder barrel which includes a plasticizing zone for plasticizing incoming plastic material and a discharge zone for discharging plasticized material into the injection unit, said extruder including an extruder screw which is received in the barrel and has a screw channel, wherein the screw channel of the extruder screw in the discharge zone has a channel depth which is greater than a channel depth in the plasticizing zone so as to provide an intermediate storage space.

10. The injection molding device of claim 9, wherein the extruder is a twin screw extruder and includes a second said extruder screw received in the barrel, whereby the extruder screws mesh with one another and are disposed in parallel relationship.

* * * * *